United States Patent
Vaidya

(10) Patent No.: US 8,015,432 B1
(45) Date of Patent: Sep. 6, 2011

(54) METHOD AND APPARATUS FOR PROVIDING COMPUTER FAILOVER TO A VIRTUALIZED ENVIRONMENT

(75) Inventor: Anish Vaidya, Santa Clara, CA (US)

(73) Assignee: Symantec Corporation, Mountain View, CA (US)

( * ) Notice: Subject to any disclaimer, the term of this patent is extended or adjusted under 35 U.S.C. 154(b) by 477 days.

(21) Appl. No.: 11/864,840

(22) Filed: Sep. 28, 2007

(51) Int. Cl.
*G06F 11/00* (2006.01)
(52) U.S. Cl. ...................................................... 714/4.11
(58) Field of Classification Search ............... 714/4, 4.11
See application file for complete search history.

(56) References Cited

U.S. PATENT DOCUMENTS

| | | | |
|---|---|---|---|
| 6,996,502 B2 * | 2/2006 | De La Cruz et al. ........... | 702/188 |
| 7,099,948 B2 * | 8/2006 | Tormasov et al. ............ | 709/229 |
| 7,480,822 B1 * | 1/2009 | Arbon et al. ..................... | 714/13 |
| 7,689,862 B1 * | 3/2010 | Bharthulwar et al. ........... | 714/13 |
| 7,783,856 B2 * | 8/2010 | Hashimoto et al. ........... | 711/173 |
| 2003/0018927 A1 * | 1/2003 | Gadir et al. ....................... | 714/4 |
| 2005/0108593 A1 * | 5/2005 | Purushothaman et al. ....... | 714/4 |
| 2005/0120160 A1 * | 6/2005 | Plouffe et al. ..................... | 711/1 |
| 2007/0283147 A1 * | 12/2007 | Fried et al. ..................... | 713/167 |
| 2008/0271030 A1 * | 10/2008 | Herington ..................... | 718/104 |
| 2010/0146109 A1 * | 6/2010 | Yoon ............................. | 709/224 |
| 2010/0268983 A1 * | 10/2010 | Raghunandan .................. | 714/3 |

* cited by examiner

*Primary Examiner* — Christopher S McCarthy
(74) *Attorney, Agent, or Firm* — Campbell Stephenson LLP

(57) ABSTRACT

A method and apparatus for providing failover to a virtualized environment. The method and apparatus comprise a standby node having a virtualized environment that supports a plurality of resource partitions that operate within the standby node upon a failover of a server within a computer system.

16 Claims, 4 Drawing Sheets

US 8,015,432 B1

METHOD AND APPARATUS FOR PROVIDING COMPUTER FAILOVER TO A VIRTUALIZED ENVIRONMENT

BACKGROUND OF THE INVENTION

1. Field of the Invention

Embodiments of the present invention generally relate to high availability computer systems and, more particularly, to a method and apparatus for providing computer failover to a virtualized environment.

2. Description of the Related Art

Modern computer systems require high availability of the computer services provided to clients. Such high availability systems generally provide a cluster of servers (nodes) that redundantly operate to facilitate replacing a failed server with another server to provide seamless computer services to users. The transition of services from a failed server to another server is known as failover. Alternately, if service itself faults, with or without a hardware failure, the service needs to be transitioned to another server as a failover. In order to increase availability of services, computer systems deploy one or more redundant servers that can execute applications (or provide resources) running on other cluster nodes in the cluster whenever a server or application faults. This is traditionally described as an N+1 failover configuration. However, at any point in time, if two or more servers fault and the standby server begins executing those applications, there is a chance that an errant application may interfere with other application space and cause a failure of all applications executing on the standby server. Consequently, the cluster no longer provides services with high availability.

Therefore, there's a need in the art for improved failover processing within computer systems.

SUMMARY OF THE INVENTION

Embodiments of the present invention generally comprise a method and apparatus for providing failover to a virtualized environment. The method and apparatus comprise a standby node having a virtualized environment that supports a plurality of software partitions that operate within the standby node upon a failover of a server within a computer system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
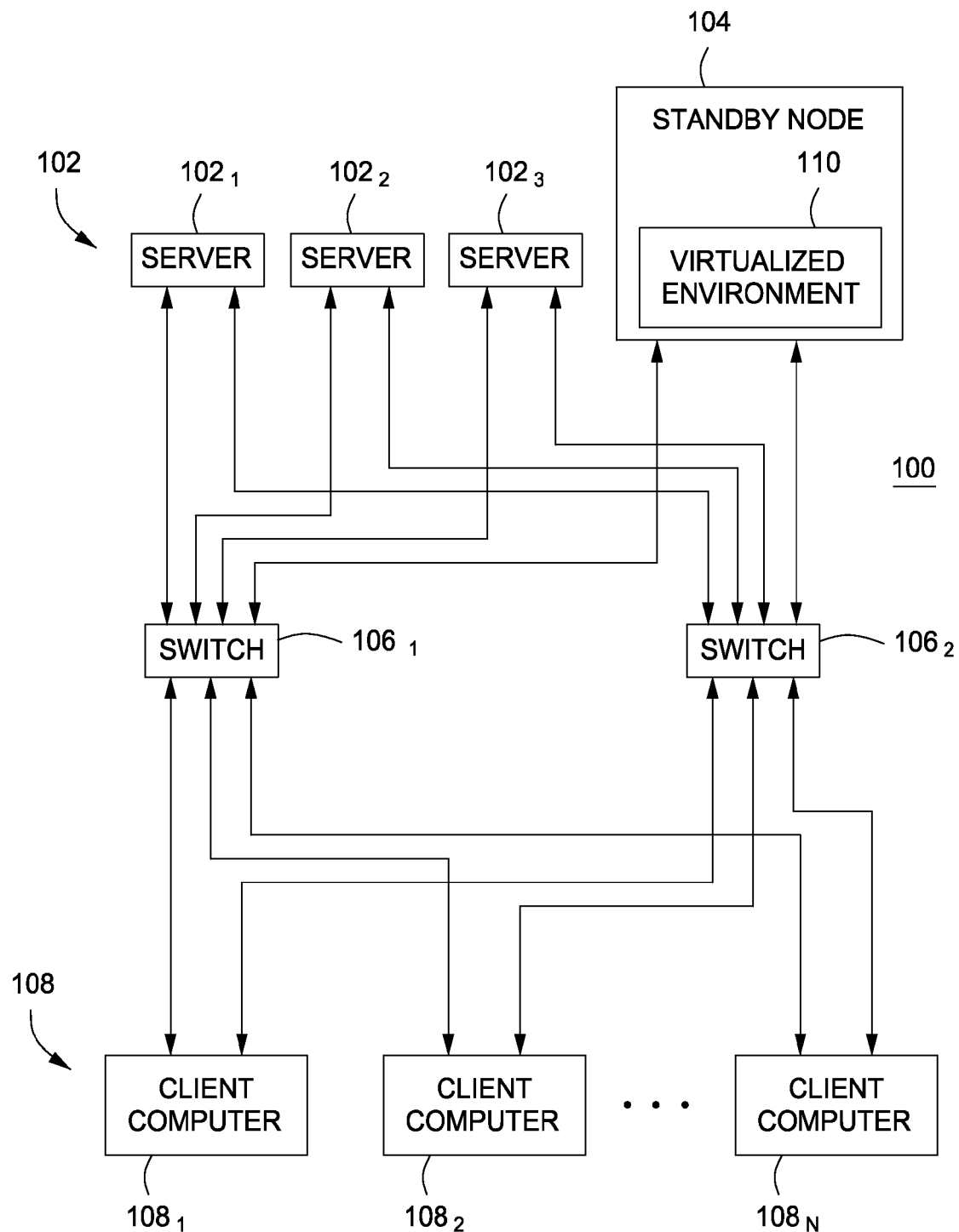
FIG. 1 is a block diagram illustrating a high availability computer system in accordance with one embodiment of the present invention.

FIG. 1 depicts a block diagram illustrating a high availability computer system 100 that provides redundant servers 102 providing services to client computers 108. System 100 comprises a plurality of servers 102, $102_2$, and $102_3$ (collectively referred to as servers 102), a standby node 104 (also referred to as a standby server), a pair of network switches $106_1$ and $106_2$, and a plurality of client computers $108_1$, $108_2$, and $108_3$ (collectively referred to as computers 108). The client computers 108 are coupled to the redundant switches $106_1$ and $106_2$. The switches $106_1$ and $106_2$ provide computer resources to the client computers 108. The standby node 104 supports a virtualized environment 110 that is used to support failover of any or all of the resources executing upon servers 102.

Figure 2:
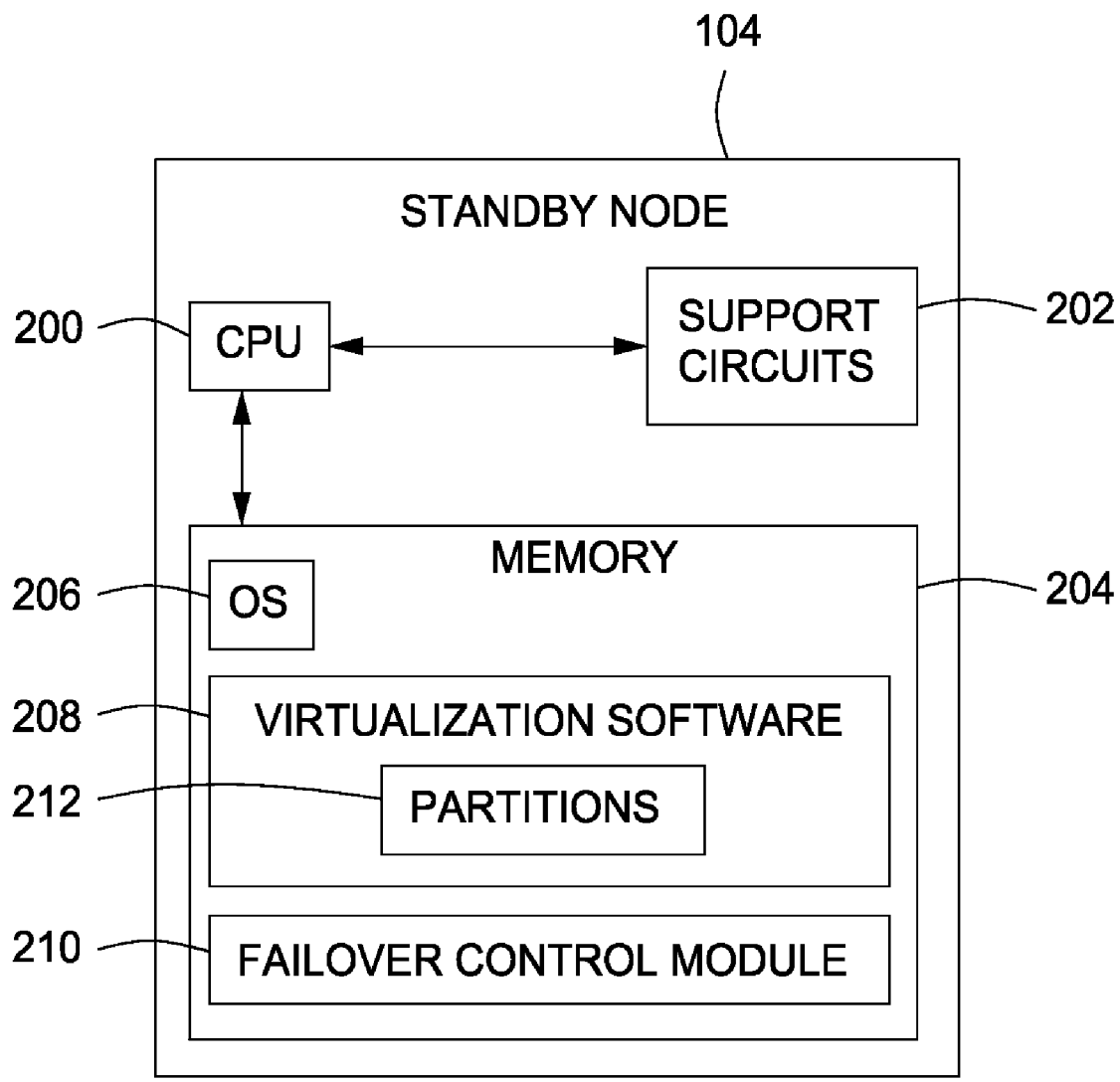
FIG. 2 depicts a detailed block diagram of the standby node of FIG. 1 in accordance with one embodiment of the present invention.

FIG. 2 depicts a detailed block diagram of the standby node 104 of FIG. 1. The node 104 supports a virtualized environment in accordance one embodiment of the present invention. The standby node 104 comprises a central processing unit (CPU) 200, support circuits 202 and memory 204. The CPU 200 may comprise a microprocessor, instructions set processor, a microcontroller or similar data processing element known in the art. The support circuits 202 may include power supplies, clock circuits, data registers, I/O circuitry, and the like to facilitate operation of the CPU 200. The memory 204 comprises at least one of random access memory, read only memory, removable storage, flash drives, or combinations thereof. The support circuits 202 and memory 204 are coupled to the CPU 200.

The memory 204 stores an operating system 206, virtualization software 208 and an high-availability control module 210. The high-availability control module 210 may be a portion of an overall high-availability, server clustering system such as VERITAS CLUSTER SERVER (VCS) available from Symantec Corporation. Upon failure of a resource on a server 102, the high-availability control module 210 launches the virtualization software 208 to instantiate at least one partition 212 to support the failed resource. Such partitions also known as Zones in a SOLARIS environment, Secure Resource Partitions on HPUX or Work Load Partitions on AIX. All of these various terms mean a virtual environment in which a computer resource may independently operate. The virtualization software 208 supports such a partition 212 that shares the operating system 206 with multiple resources that are supported in independent partitions 212. The high-availability control module 210 utilizes agents to monitor the operation of the resources throughout the computer system and, upon detecting a failure of a resource within the system, launches the virtualization software 208 that instantiates a partition 212 for the failed resource. In this manner, N servers 102 can be failed over to one physical server supporting N partitions, i.e., an N+N failover configuration.

Figure 3:
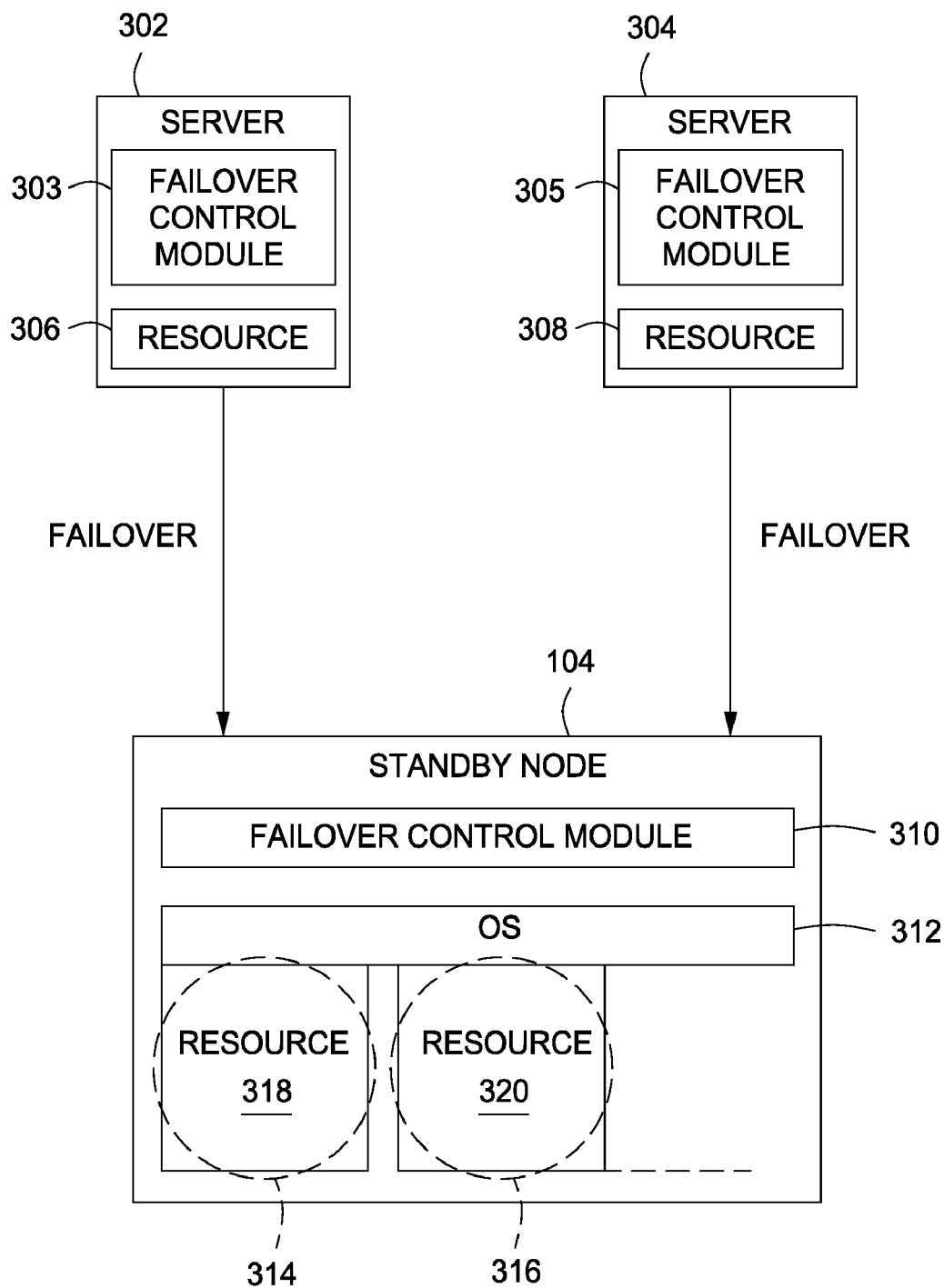
FIG. 3 depicts a illustration of a failover process utilizing a standby node supporting a virtualized environment in accordance with one embodiment of the present invention.

FIG. 3 depicts an illustration of the failover process using the N+N failover configuration in accordance with one embodiment of the present invention. The system 300 depicts a first server 302 and a second server 304 each of which has a failed resource 306 and 308, respectively. A high-availability control module 303 running on server 302 senses the failure of resource 306 and initiates failover to the standby node 104. The high-availability control module 310 running on standby node 104 launches a partition 314 that includes a virtualized resource 318. Once the partition is formed and the resource 318 instantiated, the failover process proceeds in a conventional manner as would be used if the failover were to a redundant physical server. When the resource 308 is detected as failed by the high-availability control module 305, the high-availability control module 310 launches a second partition 316 on the same standby node 104 that supports virtualized resource 320. In these instances, the resources 318 and 320 share the operating system 312. Other resources external to the failed resources may also be shared by the multiple virtualized environments.

The partition itself is managed by the high-availability control module 310 as a resource in a service group containing the applications that are launched as resources. A service group can have some resources that are managed (brought up, monitored and shut down) outside of the partition, including the partition resource itself whereas the application/service resources are managed within the partition. Salient features of the N+N failover configuration include no memory footprint inside the partition, a single configuration is used to manage resources inside and outside of the partition, and minimal changes are required to the existing data services (agents that report resource failures) that run on the various servers within the cluster. At the service group level, a user needs to define a parameter ContainerInfo that defines the name, type, and enablement properties of the virtualized environment of the partition, while behavior of individual resources can be controlled at the resource level by another attribute of the partition deemed ContainerOpts.

The technique enhances the partition model to allow specifying system specific ContainerInfo for a service group. For example, on a Solaris 2.9 system, which does not support software partitions (Zones), Containerinfo::enabled can be set to "2" to indicate a tri-state or "don't care" for the specified partition. All the resources are established outside the partition and the partition resource reports the state of the service group instead of managing the partition (Zones on a Solaris system). The partition resource thus acts a no-op or "don't care" resource. When the service group fails over to a Solaris 2.10 system and if the Containerinfo::enabled is set to "1" for that system, the high-availability control module 310 manages all the resources including the partition resource itself. Consequently, using this technique an N+1 physical server configuration can be used to provide an N+N failover configuration.

Figure 4:
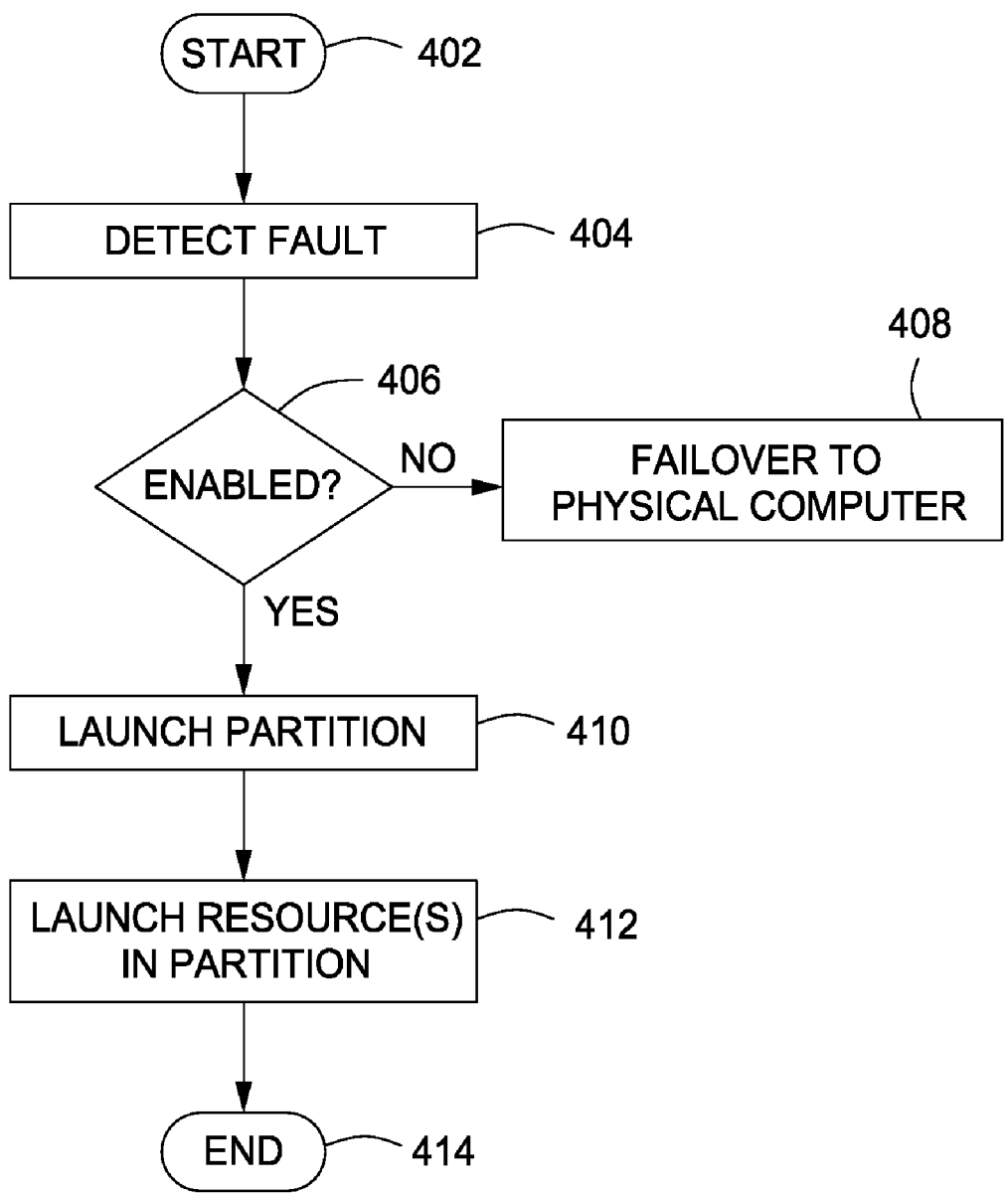
FIG. 4 is a flow diagram illustrating a method for providing failover of a resource to a standby node comprising a virtualized environment in accordance with one embodiment of the invention.

FIG. 4 depicts a flow diagram of the method 400 for providing a failover technique using a virtualized environment in accordance with one embodiment of the present invention. The method 400 begins at step 402 and proceeds to step 404, wherein an application or server fault is detected. Fault detection is usually provided by agents that operate on various elements of a high availability system. Fault detection leads to a failover onto the standby node. These agents may reside on servers and/or switches within the cluster to report resource failure and instantiate a failover process. At step 406, upon failover, the method 400 queries whether the Containerinfo:: enabled field is set to provide failover to a virtualized environment or to a physical environment. As such, if the failover target is a Solaris 2.9 system, then the method 400 proceeds to step 408, where the failover will occur to a physical computer because Solaris 2.9 does not support software partitions. As such, the high-availability control module sets the partition resource to a no-op or don't care resource. However, if the Containerinfo::enabled field is set to 1 (i.e. enabled) then the method 400 proceeds to step 410. At step 410, the high-availability control module launches a partition within the virtualized environment using the name and type information that is provided by the ContainerInfo attributes. At step 412, the high-availability control module launches the resources within the partition to complete the failover process. At step 414, the method 400 ends now having launched the partition and the resource or resources within the partition to replace the failed resource. Upon a resource being restarted or brought back online within a physical machine of the cluster, the high-availability control module can failback the virtualized resource to a physical server that supports the resource. After such a failback, the partition that supported the resource within the virtualized environment is terminated.

While the foregoing is directed to embodiments of the present invention, other and further embodiments of the invention may be devised without departing from the basic scope thereof, and the scope thereof is determined by the claims that follow.

The invention claimed is:

1. A method comprising:
   detecting a failure of a resource, wherein
      the resource is executed by a first server;
   launching a partition, within a virtualized environment, wherein
      the partition is launched on a second server,
      the partition is configured with a set of properties,
      the set of properties is associated with an operating environment of the first server,
      the set of properties comprises
         one or more enablement properties,
      the one or more enablement properties are necessary for proper execution of the associated partition within the virtualized environment, and
      the one or more enablement properties specify whether the virtualized environment is capable of supporting software partitions; and
   facilitating failover of the resource from the first server to the second server by launching a resource within the partition, wherein
      the one or more enablement properties differentiate whether resources of a system may be established outside the partition,
      the failover is performed in accordance with the one or more enablement properties, and
      the resource within the partition reports the state of a service group instead of managing the partition.

2. The method of claim 1, wherein
   the first server is among N servers, wherein
      N is an integer greater than 1, and
      the N servers have resources that are launched in N partitions within a virtualized environment on the second server.

3. The method of claim 1, wherein
   a plurality of servers are configured to failover to the second server, and
   the plurality of servers comprise the first server.

4. The method of claim 1, further comprising:
launching a plurality of partitions, wherein
each partition in the plurality of partitions shares a single operating system.

5. The method of claim 4, further comprising:
launching a plurality of resources within the plurality of partitions, wherein
at least one resource of the plurality of resources is supported outside of the plurality of partitions, and
the at least one resource is shared by plurality of partitions.

6. The method of claim 1, wherein
the one or more enablement properties comprise a ContainerInfo property.

7. The method of claim 6, further comprising:
configuring a resource within a virtual environment, wherein
the resource is configured using information specified in the ContainerInfo property, and
the resource is configured when the virtual environment is capable of supporting a software partition.

8. An apparatus comprising:
a standby server, wherein
the standby server is configured to
launch a virtualized environment,
launch a plurality of partitions within the virtualized environment by virtue of being configured to launch a partition of the plurality of partitions for at least one failed resource within a computer system, and
facilitate failover of the at least one failed resource by launching a resource within a particular partition of the plurality of partitions,
the particular partition comprises
a backup instance of the at least one failed resource associated with the particular partition,
the particular partition is configured with a set of properties associated with an operating environment of a primary server,
the set of properties comprises
one or more enablement properties for the particular partition within the virtualized environment,
the one or more enablement properties differentiate whether resources of a system may be established outside the particular partition,
the one or more enablement properties specify whether the virtualized environment is capable of supporting software partitions, and
the resource within the particular partition reports the state of a service group instead of managing the partition.

9. The apparatus of claim 8, wherein at least one resource is launched in the partition.

10. The apparatus of claim 8, wherein the standby server provides failover services for a plurality of servers.

11. The apparatus of claim 8, wherein
each of the at least one resources operates independently within the particular partition to which the each at least one resource is assigned.

12. The apparatus of claim 8, wherein
the partitions share an operating system.

13. A high-availability computer system comprising:
a plurality of servers, wherein
each of the plurality of servers is configured to provide a resource, and
the each of the plurality of servers comprises
a high availability control module; and
a standby node, coupled to the plurality of servers, wherein
the each of the plurality of servers is configured to
instantiate a partition of a plurality of partitions within a virtualized environment for the each of the plurality of servers, and
launch a backup instance of at least one of the resources in each partition of the plurality of partitions when the high availability control module detects a resource fault, wherein
the resource fault represents at least one failed resource, and
the at least one of the resources is associated with the each partition of the plurality of partitions,
the each partition of the plurality of partitions comprises
a backup instance of the at least one failed resource, wherein
the at least one failed resource is associated with the each partition of the plurality of partitions,
the each partition of the plurality of partitions is configured with a set of properties, wherein
the set of properties is associated with an operating environment of an associated server of the plurality of servers,
the set of properties comprises one or more enablement properties for the each particular partition of the plurality of partitions within the virtualized environment,
the one or more enablement properties differentiate whether resources of a system may be established outside the each partition of the plurality of partitions, and
the one or more enablement properties specify whether the virtualized environment is capable of supporting software partitions, and
each backup instance of the at least one of the resources reports the state of a service group instead of managing the partition of the plurality of partitions.

14. The high-availability computer system of claim 13, wherein
a copy on the standby node is launched during a failover process, and
the failover process causes the resource to be failed over from a server to the partition.

15. The high-availability computer system of claim 13, wherein
a second partition is instantiated upon the detection of a second resource fault, and
a second resource is launched in the partition instantiated within the virtualized environment.

16. A high-availability computer system comprising:
N servers; and
a single standby node, wherein
the combination of the single standby node and the N servers form an N+N failover configuration,
N is an integer of 2 or more,
the single standby node supports a virtualized environment having N possible partitions,
at least one of the resources is associated with each of the N possible partitions,
each of the N possible partitions comprises
a backup instance of at least one failed resource, wherein
the at least one failed resource is associated with the each of the N possible partitions,
each partition of the N possible partitions is configured with a set of properties, wherein the set of properties is associated with an operating environment of an associated server of the N servers, and the set of properties comprises one or more enablement properties for an associated partition within the virtualized environment, the one or more enablement properties differentiate whether resources of a system may be established outside the particular partition, the one or more enablement properties specify whether the virtualized environment is capable of supporting software partitions, and each backup instance of the at least one of the resource reports the state of a service group instead of managing the each of the N possible partitions.

\* \* \* \* \*